(12) United States Patent
Carroll et al.

(10) Patent No.: US 8,124,145 B2
(45) Date of Patent: *Feb. 28, 2012

(54) SUGAR ALCOHOL SANDED CHEWING GUM AND PROCESS FOR MAKING SAME

(75) Inventors: Thomas J. Carroll, Mechanicsburg, PA (US); Robert J. Huzinec, Hummelstown, PA (US); Christopher A. Bennett, Palmyra, PA (US); Justin E. May, Hershey, PA (US); Tesfalidet Halie, LaFayette, CA (US)

(73) Assignee: The Hershey Company, Hershey, PA (US)

( * ) Notice: Subject to any disclaimer, the term of this patent is extended or adjusted under 35 U.S.C. 154(b) by 275 days.

This patent is subject to a terminal disclaimer.

(21) Appl. No.: 11/432,053

(22) Filed: May 10, 2006

(65) Prior Publication Data

US 2007/0098844 A1    May 3, 2007

Related U.S. Application Data

(60) Provisional application No. 60/679,494, filed on May 10, 2005.

(51) Int. Cl.
    *A23G 4/18* (2006.01)
(52) U.S. Cl. ............................................ 426/5; 426/3
(58) Field of Classification Search .................. 426/5
    See application file for complete search history.

(56) References Cited

U.S. PATENT DOCUMENTS

| 4,317,838 | A | * | 3/1982 | Cherukuri et al. | 426/5 |
| 4,379,169 | A | | 4/1983 | Reggio et al. | |
| 4,940,594 | A | * | 7/1990 | Van Alstine | 426/231 |
| 4,976,972 | A | * | 12/1990 | Patel et al. | 426/3 |
| 5,527,542 | A | * | 6/1996 | Serpelloni et al. | 424/488 |
| 6,764,706 | B1 | | 7/2004 | Heikkila et al. | |
| 2007/0275129 | A1 | * | 11/2007 | Pershad et al. | 426/104 |

FOREIGN PATENT DOCUMENTS

| WO | WO 94/21827 A1 | 9/1994 |
| WO | WO 01/56398 A1 | 8/2001 |

OTHER PUBLICATIONS

Steagall et al. "Polyol: Beyond Sweet Taste", www.foodproduct design.com, posted Oct. 1, 2007, p. 1-3.*
Jackson, E.G. "Section 11.10 Soft Panning" in Sugar Confectionery Manufacturing, p. 254.*

* cited by examiner

*Primary Examiner* — Elizabeth Gwartney
(74) *Attorney, Agent, or Firm* — Scully, Scott, Murphy & Presser, P.C.

(57) ABSTRACT

A chewing gum comprising a solid shaped chewing gum composition sanded with a sugar alcohol having a negative heat of solution and a method of mixing same. The method involves coating solid pieces of chewing gum composition with a wetting syrup and sanding the wetted pieces with sugar alcohol crystals. The chewing gum is characterized by intense initial cooling and flavor release.

29 Claims, No Drawings

SUGAR ALCOHOL SANDED CHEWING GUM AND PROCESS FOR MAKING SAME

RELATED APPLICATIONS

The present application is claiming priority of provisional application U.S. Ser. No. 60/679,494 filed on May 10, 2005.

BACKGROUND OF THE DISCLOSURE

1. Field of the Invention

The present invention is directed to a chewing gum which provides instantaneous cooling and immediate intense sweetness and a process of making that composition. More particularly, the present invention is directed to a chewing gum which includes a solid whose surface is sanded with crystals of a sugar alcohol having a negative heat of solution.

2. Background of the Prior Art

One of the sweeteners employed in the manufacture of chewing gums is xylitol. Xylitol, although a non-cariogenic sweetener, leaves little unfavorable aftertaste and simulates the texture and chewing characteristics of conventional cariogenic chewing gums. As taught in U.S. Pat. Nos. 3,899,593 and 3,914,434, xylitol not only possesses non-cariogenic properties but has substantially the same sweetening power as conventional cariogenic-producing sugars. Moreover, xylitol is highly soluble in water and possesses a relatively large negative heat of solution and is thus capable of producing significant cooling effects in the mouth.

A recent development in the chewing gum arts has been the development of chewing gums which impart intense cooling flavor upon initial contact in the mouth. To effectuate this feeling compounds well known for their physiological cooling effect on the skin and the mucous membranes of the mouth have been employed in such chewing gums. A particularly favored compound in this application is menthol. Menthol and other like materials, although imparting cooling effect to the mouth, also emit very strong undesirable odor and bitter taste. This is caused by the high volatility of menthol and like additives.

The above remarks establish a need in the art for a sweetener which provides the advantages of strong sweetening effects, the absence of exposure to cariogenic agents and, most importantly, high intense cooling effect without attendant undesirable odor and flavor.

Sweetening agents are employed in confectioneries, including chewing gums, as internal components. Sweetening agents, however, have also been employed as surface additives to confectionaries. Molded jellies and pastries are often "sanded" with sugars. Sugar sanding of these confectioneries provide an attractive appearance, keep molded pieces from sticking together during production and enhance initial sweetness.

Sanding of chewing gums, however, has not been practiced in the prior art. This is not to say that sugar coating of chewing gums is unknown in the art. "Dusting" of chewing gum has been practiced in the past. Sanding and dusting are distinguished processes in the confectionary arts. Dusting is defined as the application of a uniform coating of fine powder particles to a surface, such as the surface of a chewing gum stick. Sanding, on the other hand, involves the embedding of solid crystals below the surface of the confectionary, such as a chewing gum solid. Sanding, by definition, consists of making fine sugar crystals which adhere to the surfaces of the products by moistening them beforehand using techniques known in the art, such as by applying dry steam, or a hot solution of gum arabic or maltodextrin to the surface, and then subsequently drying the products.

Whereas dusting provides a uniform height of fine particles, sanding, involving as it does random penetration of the surface, results in contact with solid particles of varying height and thus different concentration of the particles.

Not only has there not been any sanding of chewing gum in the prior art; indeed, there has never been sugar alcohol sanding of any confectionary in the prior art. Although the inventors can only speculate as to the reason for this absence, they believe it is because sugar alcohols have a high degree of hydroscopicity.

Another distinction between dusting and sanding is that dusted particles are far smaller, resulting in higher surface areas per unit volume than the larger particles employed in sanding. This results in shorter duration of the effect of dusted particles than sanded particles.

The above remarks establish the need in the art for a sanded chewing gum, providing intense initial cooling accompanied by corresponding intense flavor provided by intense sweeteners.

BRIEF SUMMARY OF THE INVENTION

A new chewing gum has now been developed which provides immediate and intense cooling and flavor effects. This chewing gum, moreover, overcomes a barrier to its use which has discouraged its earlier development.

In accordance with the present invention a chewing gum is provided. The chewing gum includes a solid which includes a chewing gum composition coated with wetting syrup and sanded with crystals of a sugar alcohol having a negative heat of solution.

In further accordance with the present invention a process is provided for preparing a sanded chewing gum. In this process a solid chewing gum composition is prepared by combining gum base and a sweetening agent. A wetting syrup which includes a tackifying agent, is applied to the solid chewing gum composition. Crystals of a sugar alcohol having a negative heat of solution are applied to the wetting syrup-coated solid chewing gum composition. The surface of the sanded chewing gum solid is dried to produce the final sanded chewing gum.

DETAILED DESCRIPTION

The sanded chewing gum of the present invention comprises a chewing gum composition which includes a gum base. The gum base may be a naturally-occurring gum, such as chicle, to which other materials, including gutta and various resins of natural origin, may be added. The gum base, more typically, is modified to include varying amounts of materials of synthetic origin. Therefore, polyethylene, polyisobutylene, polyvinyl acetate, styrene-butadiene copolymers and isobutylene-isoprene copolymers may also be utilized as gum bases. Many other gum bases have been proposed and utilized in chewing gum compositions.

The gum base composition may contain elastomeric solvents to aid in softening the rubber component. Such elastomeric solvents may comprise methyl, glycerol or pentaerythritol esters of rosins or modified rosins, such as hydrogenated, dimerized or polymerized rosins or mixtures thereof. Examples of elastomeric solvents suitable for use herein include the pentaerythritol ester of partially hydrogenated wood rosin, the pentaerythritol ester of wood rosin, the glycerol ester of wood rosin, the glycerol ester of partially dimerized rosin, the glycerol ester of polymerized rosin, the glycerol ester of tall oil rosin, the glycerol ester of wood rosin and the partially hydrogenated wood rosin and partially hydrogenated methyl ester of rosin, such as polymers of alpha-pinene or beta-pinene; terpene resins including polyterpene and mixtures thereof. The solvent may be employed in an amount ranging from about 10% to about 75% and preferably about 45% to about 70% by weight of the gum base.

A second major component of the chewing gum composition of the present invention, present in the unsanded solid component thereof, is a sweetening agent. The present invention contemplates the inclusion of sweeteners, both cariogenic and non-cariogenic, known in the art. Thus, any of the sugars, such as sucrose, glucose (corn syrup), dextrose, invert sugar, and fructose, and the like or mixtures of any of the foregoing, may be utilized. In addition, saccharine and its various salts, such as sodium or calcium salt; cyclamic acid and its various salts, such as the sodium salt and the like; dipeptide sweeteners, such as aspartame and derivatives thereof, e.g. Neotame®; dihydrochalcone compounds; glyzrrhizin; Stevia Rebardiana (Stevioside); chloro derivatives of sucrose; dihydroflavinol; hydroxyguaiacol esters; L-amino dicarboxylic acid gem-diamines; L-aminodicarboxylic acid aminoalkenoic acid ester amides; and sugar alcohols, such as sorbitol, sorbitol syrups, mannitol, xylitol; and the like may be used as the sweetening agent of the chewing gum composition.

Of the sweeteners employed in the chewing gum composition of the present invention, it is preferred that a non-cariogenic sweetener be utilized. Of the non-cariogenic sweeteners, sugar alcohols are particularly desirable. Of the sugar alcohols, xylitol is particularly preferred. Xylitol is a pentahydric alcohol formed by the hydrolysis of xylan to form xylose. Xylose is reduced to xylitol by catalytic hydrogenation. Xylitol is a crystalline compound that possesses a sweetness level of about 100% that of sucrose. Insofar as xylitol is metabolized in the body to glycogen, this alcohol is not only non-cariogenic but, in addition, may be safely consumed by those who are sugar intolerant, such as diabetics.

The solid chewing gum composition of the chewing gum of the present invention may additionally include conventional additives. Such additives include coloring agents, such as titanium dioxide; emulsifiers, such as lecithin and glyceryl monostearate; additional fillers, such as aluminum hydroxide, alumina, aluminum silicates, calcium carbonate, talc and combinations thereof; and additional flavoring agents. A particularly common additive, fillers, may also be used in the chewing gum composition in varying amounts. Preferably, the amount of filler, when used, varies from about 4% to about 35% by weight, based on the total weight of the chewing gum composition.

A flavoring agent or agents may be provided in the chewing gum composition. Useful flavoring agents may be chosen from synthetic flavoring liquids and/or liquids derived from plants, leaves, flowers, fruits, and combinations thereof. Preferably, the flavoring component is selected from spearmint oil, cinnamon oil, oil of wintergreen (methyl salicylate) and peppermint oils. Also useful are artificial, natural or synthetic fruit flavors, such as citrus oil including lemon, orange, grape, lime and grapefruit, and fruit essences including apple, strawberry, cherry, pineapple and so forth. The flavors may include gelatin-based flavor capsules and/or encapsulated flavors.

The amount of flavoring agent employed is normally a matter of preference subject to such factors as flavor type, base type and strength desired. In general, flavoring agents in an amount of about 0.5% to about 10.0% by weight of the final chewing gum composition are usable with amounts of about 0.5% to about 4.0% being preferred and about 0.7% to about 3.5% being most preferred.

The chewing gum may also include suitable auxiliary flavorings including both natural and artificial flavors, and mints, such as peppermint, menthol, artificial vanilla, cinnamon, various fruit flavors, both individual and mixed, and the like are contemplated. The flavorings are generally utilized in amounts that will vary depending upon the amount of the flavor delivery system employed and may, for example, range in amounts of up to about 2% by weight of the final chewing gum composition weight. Thus, flavorings may be presented in the delivery system, in the chewing gum composition itself or both.

Colorants may also be added to the chewing gum composition of the present invention. Colorants are introduced into the chewing gum composition in coloring effective amounts. It is preferred that the colorants, which include pigments, such as titanium dioxide, if present, are incorporated into the chewing gum composition in an amount of up to about 1% by weight, and even more preferably, up to about 0.5% by weight. The colorants may also include dyes suitable for food, drug and cosmetic applications. These colorants known as FD&C dyes and lakes and the like.

A variety of traditional ingredients, such as plasticizers or softeners, e.g., lanolin, stearic acid, sodium strearate, potassium strearate, glyceryl triacetate, glycerin and the like, for example, natural waxes, petroleum waxes, such as polyethylene waxes and microcrystalline waxes may also be incorporated into the gum base to obtain a variety of desirable textures and consistency properties.

The chewing gum composition solid may be in any form known in the art, such as stick gum, slab gum, chunk gum, shredded gum, and tablet gum. The chewing gum composition of the present invention is preferably a chunk gum and more preferably a cube shaped gum.

The sanding described hereinabove is effected on a chewing gum. The chewing gum composition, which is thereupon sanded, preferably comprises between about 40% and about 60% sugar alcohol, and between about 20% and about 30% gum base. The above-discussed remaining components constitute the remainder of the solid unsanded chewing gum composition. These percentages are by weight, based on the total weight of the chewing gum composition.

The formation of the chewing gum composition into one of the shapes mentioned above is standard in the art. That is, the gum base is heated, an oleagenous plasticizer added thereto and mixed therein. The sweetener is thereupon added under mixing while heated and the flavors and coloring agents are added thereto. The resultant composition is thereupon formed into the desired shaped size. In the preferred embodiment wherein a cube-shaped solid is prepared, the chewing gum composition is formed into cylindrical shape and cut into cube-shaped chewing gum pieces.

Although the pieces of the chewing gum composition solid may include a high concentration of sugar alcohol, which may be xylitol, it is still not enough, in spite of its endothermic heat of solution, to provide the desired level of instantaneous cooling and thus immediate sweetness in the mouth. This is so because a sugar alcohol, which may be xylitol, when mixed with a gum base is dissolved or otherwise incorporated into the elastomeric matrix and is not immediately available to saliva in the oral cavity. Thus, to provide the requisite cooling and immediate sweetness that is not presently provided by chewing gums, the chewing gum composition of the instant invention is sanded with a sugar alcohol having a negative heat of solution.

Of all the commercially available sugar alcohols, xylitol has a very high sweetening level. It, moreover, has one of the highest negative heats of a solution of any sugar alcohol. It furthermore possesses a high solubility in aqueous solutions including human saliva. These properties make it an excellent candidate for employment in the present invention.

Erythritol is another sugar alcohol well suited to the present invention. Erythritol has the highest negative heats of solution of any commercially available sugar alcohol thus providing excellent cooling effect.

Although xylitol and erythritol are particularly preferred sugar alcohols for use in the present invention, xylitol, because of its greater sweetness intensity and rate of solubility, is most preferred. It is emphasized, however, that other sugar alcohols, such as sorbitol, maltitol and mannitol, for example, as well as mixtures of these and other sugar alcohols, may also be employed.

In order to apply the sugar alcohol, preferably xylitol and/or erythritol crystalline particles, to the surface of the chewing gum composition, the surface must be prepared so that the sanded particles can adhere thereto. To provide this adhesion a wetting syrup is applied to the surface. In a preferred embodiment, the wetting syrup includes a food acceptable tackifying agent. More preferably, the tackifying agent is present in a tackifying solution. The solution, in a preferred embodiment, includes Gum Arabic. More preferably, the wetting solution is a solution of a sugar alcohol and the tackifying agent, such as Gum arabic. The sugar alcohol is present in an amount ranging from about 40 to about 80 by weight of the wetting syrup and more preferably from about 60 to about 70% by weight of the wetting syrup. The tackifying agent is preferably present in about 1% to about 5% by weight of the wetting syrup. Still more preferably, the sugar alcohol is xylitol, mannitol, erythritol, maltitol. Even still more preferably, the wetting solution sugar alcohol is maltitol. In that preferred embodiment, it is desirable that the maltitol be present in a concentration of about 66% by weight in the syrup of at least maltitol and Gum Arabic at about 1% to about 5% by weight of the syrup, the remainder being water. These percentages are by weight, based on the total weight of the wetting solution applied to the chewing gum pieces. Those skilled in the art appreciate that usage rate is indicative of the amount of Gum Arabic, the tackifying agent, that adheres to the chewing gum composition, rather than the amount actually present in the syrup processed.

A sugar alcohol is utilized in a preferred embodiment of the wetting syrup in order to further enhance the immediate burst of flavor and cooling provided by the sugar alcohol sanded particles. Maltitol is particularly preferred in this application because of its sweetness.

The sugar alcohol crystals are thereupon applied to the wetting syrup-coated chewing gum composition solid pieces. A sufficient amount of polyol is present on the wetting syrup coated chewing gum to impart a coolness sensation when bit into by a consumer, such as humans. The crystals, preferably xylitol and/or erythritol, are applied such that the chewing gum pieces preferably include between about 5% and about 12% sanded crystals. More preferably, the crystals are present in a concentration of between about 5% and about 10%. Still more preferably, the sugar alcohol sanded crystals constitute between about 6% and about 9%. These percentages are by weight based on the total weight, of the chewing gum sanded pieces.

The sanded chewing gum of the present invention is prepared by forming the unsanded chewing gum composition, as described above, into the desired shape. Shaping, which occurs by extrusion, molding, pelletizing, tabletting or other forming techniques well known in the chewing gum arts, occurs while the chewing gum composition is in malleable state. In a preferred embodiment, the malleable chewing gum composition is extruded into a cylindrical shape.

The shaped chewing gum composition is thereupon cooled into the desired solid shape and cut into the desired chewing gum pieces. In the preferred embodiment wherein the chewing gum composition is cylindrically shaped, the cylindrically shaped chewing gum composition is cut into cubed shaped pieces. The cut pieces, which are soft and pliable, are thereupon cured to provide texture and structure and thus be suitable for subsequent coating.

The cut cured pieces, which are soft and pliable are next coated with a wetting syrup. Wet syrup coating is provided by panning, spray coating or other coating methods known in the chewing gum arts. The wet syrup coated surface of the chewing gum composition is next subjected to sanding wherein sugar alcohol particles are applied to the wetted syrup coated surface. The sugar alcohol particles embed, at various depths, into the shaped chewing gum composition pieces.

Once the solid shaped chewing gum is wetted with the wetting syrup, the wetted chewing gum composition is next sanded with dry crystals of sugar alcohol having a negative heat of solution utilizing sanding techniques known in the art. The sanding application occurs by applying the sugar alcohol particles onto the wetted surface of the chewing gum pieces by panning or by spray or any other method known in the art for sanding.

In the most preferred embodiment, the preferred process of the present invention for applying the wetting syrup to the surface chewing gum surface and for sanding is coating, e.g., by panning.

In the coating method, the wetting syrup is applied to a rotating mass of solid shaped chewing gum placed in a pan or belt coater using techniques known to one of ordinary skill in the art, such as for example, manually, by ladle or by automatic or semi-automatic spray coating process and the like. Preferably, the mass of confections is rotated at a speed of about 10 to about 40 rpm and more preferably between about 20 to about 25 revolutions per minute or about 80 to about 100 feet per minute belt speed. Those of ordinary skill in the chewing gum art will appreciate that the selection of the rotation speed of the pan is based on several factors, including but not limited to, the size and shape of the chewing gum, the type of chewing gum utilized and the like. Typically, the pans used are stainless steel pans that are preferably either ribbed or baffled. Optionally, a sealant coat is applied as a precoat, especially if the chewing gum contains oils or has a high acid content.

The wetting process begins by adding a small amount of wetting syrup to form a thin film on the chewing gum piece. Most preferably, the amount of wetting syrup added is sufficient to cover the surface of the chewing gum piece. Those of ordinary skill in the panning art will appreciate that the amount of wetting syrup added to form the thin film on the surface of the chewing gum piece is dependent upon and varies with various factors, such as the type of chewing gum used, the size and shape of the chewing gum, and the like.

On the one hand, applying too little wetting syrup can result in a rough surface. On the other hand, applying too much wetting syrup results in the chewing gum amassing together in the pan—a problem known as "doubling" in the art. Applying too much wetting syrup may also dissolve or melt the centers.

However, one of ordinary skill in the art can determine the appropriate conditions without much difficulty.

Furthermore, the selection of the syrup temperature and concentration turns on the desired product quality and desired gum core. The dry crystals of sugar alcohol having a negative heat of solution may be added at room temperature, although they can be added at a temperature of about 50° F. to about 90° F. Preferably, the sugar alcohol crystals that are added have an average particle size ranging from about 100 to about 500 microns and more preferably from about 110 to about 300 microns and even more preferably from about 140 to about 200 microns. The sugar alcohol crystals may be added by sprinkling onto the chewing gum as the pan is rotating.

A sufficient amount of crystals of sugar alcohol having a negative heat of solution is added to provide a cooling sensation that lasts for at least thirty seconds after the consumer first chews the chewing gum. However, it is to be noted if too much sugar alcohol crystals are added to the wetted chewing gums, the overload of dry crystals collects in the back of the pan. As the wetted chewing gum with the sugar alcohol crystals rotate, the sugar alcohol is absorbed and the sanded centers "wet back", i.e., become moist. Additional sugar alcohol crystals having a negative heat of solution are added until the wetting syrup coating on top of the chewing gum becomes dry and is not capable of holding any additional crystalline coating material.

In another embodiment, the wetting and sanding steps may be repeated until a desired size is achieved. In this way, coatings from 1 to about 100 layers are easily obtained. Preferably, the number of layers is between 1 and 10 and most preferably is one layer.

The chewing gums thus prepared are dried. Preferably, the chewing gum piece is air dried by placing it on a drying tray for sufficient time to dry, e.g., typically about 24 hours and allowing the chewing gum piece to dry.

The resulting chewing gum pieces have a heterogeneous coating of a sugar alcohol thereon which, when bit on by consumers, emits an intense cooling sensation.

The following examples are given to illustrate the present invention. Because these examples are given for illustrative purposes, the present invention should not be deemed limited thereto.

EXAMPLE 1

Manufacture of a Flavored Chewing Gum Composition

Color (0.1%) and lecithin (0.3% to 1%) are introduced into a stirred jacketed vessel maintained at a temperature of about 120° F. To this is added molten gum base at a temperature of between 180° F. and 190° F. (20% to 30%) which is mixed with the other contents until uniform. Xylitol (35% to 60%) is next introduced and mixed with the earlier introduced contents of the jacketed vessel. Flavors (0.5% to 3.5%) is now added with mixing. Mannitol (7% to 12%) is next added followed by maltitol syrup (10% to 11%) and the contents are uniformly mixed until homogenous. To the uniformly mixed content is added high intensity sweeteners (0.1% to 1%) e.g. acesulfame-K, aspartame or derivatives, e.g., Neotame®. The contents are uniformly mixed to produce a uniform solid batch at a temperature of 115° F. to 125° F.

The parenthesized percentages represent the percent by weight of the material based on the total weight of the chewing gum composition.

EXAMPLE 2

Formation of Chewing Gum Pieces

The malleable chewing gum composition formed in Example 1 is extruded into cylindrical shape and cut into cube-shaped pieces. The cube-shaped pieces (200 lb.) are disposed in a motor-driven, revolving open-mouthed pan. The pan is rotated at a speed of 20 to 25 revolutions per minute. Xylitol (5 lb.) is sprinkled over the tumbling pieces followed by the coating with a wetting syrup, the formation of which is described immediately below.

A wetting syrup is prepared by combining maltitol syrup (9.60 lb.) and Gum Arabic (0.4 lb.) by first weighing the maltitol syrup and loading it into a container provided with a mixer. A vortex is formed in the container by the mixer. At this point the Gum Arabic powder is slowly added and mixed with the maltitol syrup providing a syrup solids content of 66% to 67%. The resultant solution is stored at ambient temperature (68° F. to 72° F.) to prevent recrystallization and evaporation.

The wetting syrup (3.75 lb.), is applied to the xylitol sprinkled chewing gum cubes over a period of 30 to 60 seconds while the chewing gum cubes continues to be tumbled. Tumbling continues after the application of the wetting syrup for an additional 30 to 90 seconds to permit uniform coating of the wetting syrup over the entire 200 lbs. of chewing gum cubes. Thereupon, xylitol (9.6 lb.) crystals is sprinkled onto the chewing gum cubes to sand the wetting syrup coated cubes. This step occurs over a period of 30 to 60 seconds. Tumbling is allowed to continue for 60 to 120 seconds subsequent to xylitol addition to uniformly sand each chewing gum cube. After the back of the pan is observed, to insure that no xylitol remained in the pan, tumbling is terminated.

Unless indicated to the contrary, the percentages are by weight.

The above embodiments and examples are given to illustrate the scope and spirit of the present invention. These embodiments and examples will make apparent, to those skilled in the art, other embodiments and examples. These other embodiments and examples are within the contemplation of the present invention. Therefore the present invention should be limited only by the appended claims.

What is claimed is:

1. A chewing gum comprising a solid chewing gum composition consisting of one layer of coating thereon, said coating comprised of a wetting syrup sanded with crystals of a sugar alcohol having a negative heat of solution comprised of xylitol, resulting in an uneven coating of sugar alcohol on said chewing gum, whereby sugar alcohol crystals are embedded below the surface of the chewing gum and are of varying height in the coating of the chewing gum, said sugar alcohol being present in sufficient amounts to impart an instantaneous cooling sensation when bit into by a consumer, and said sugar alcohol crystals having an average particle size ranging from about 140 to about 200 microns.

2. A chewing gum in accordance with claim 1 wherein said sugar alcohol sanding crystals are xylitol and erythritol.

3. A chewing gum in accordance with claim 1 wherein said sugar alcohol sanding crystals are xylitol.

4. A chewing gum in accordance with claim 1 wherein said wetting syrup includes a tackifying agent.

5. A chewing gum in accordance with claim 4 wherein said tackifying agent is Gum Arabic.

6. A chewing gum in accordance with claim 5 wherein said wetting syrup is a mixture of gum arabic and a maltitol syrup.

7. A chewing gum in accordance with claim 1 wherein said chewing gum composition comprises a gum base and a sweetener.

8. A chewing gum in accordance with claim 7 wherein said sweetener comprises a sugar alcohol.

9. A chewing gum in accordance with claim 8 wherein said sweetener is xylitol.

10. A chewing gum in accordance with claim 7 wherein said chewing gum composition additionally comprises flavoring agents, odorants, and food acceptable coloring agents.

11. A chewing gum in accordance with claim 1 wherein said chewing gum composition is cube-shaped.

12. A chewing gum in accordance with claim 1 wherein said sanding crystals of sugar alcohol are present in amounts ranging from between about 5% to about 12%, said percentages being by weight, based on the total weight of said chewing gum.

13. A method of making a sanded chewing gum comprising:
   a) preparing a chewing gum composition comprising combining a gum base and at least one sweetening agent;
   b) forming said chewing gum composition into a solid shape;
   c) coating said solid-shaped chewing gum composition with a wetting syrup, and
   d) sanding said wetting syrup coated chewing gum composition with crystals of a sugar alcohol having a negative heat of solution comprised of xylitol, to form an uneven coating of sugar alcohol on said chewing gum composition, wherein sugar alcohol crystals are embedded below the surface of the chewing gum and are of varying height in the coating of the chewing gum, said wetting syrup sanded with said sugar alcohol being applied to form one layer atop said chewing gum composition, said sugar alcohol crystals having an average particle size ranging from about 140 to about 200 microns and being present in sufficient amounts to impart an instantaneous cooling sensation when bit into by consumer.

14. A method in accordance with claim 13 wherein said wetting syrup is applied onto the surface of said solid-shaped chewing gum composition by panning.

15. A method in accordance with claim 14 wherein said crystals of said sugar alcohol are applied to said wetting syrup on the surface of the solid-shaped chewing gum composition by panning.

16. A method in accordance with claim 13 wherein said step (b) comprises extruding said chewing gum composition in the malleable state into a cylindrical shape, cooling said cylindrically shaped chewing gum composition into a solid cylinder and forming said solid cylinder into a plurality of cubes.

17. A method in accordance with claim 13 wherein said step (b) comprises pelletizing, molding, or tabletting said chewing gum composition in the malleable state.

18. A method in accordance with claim 13 wherein said step (d) comprises applying said sugar alcohol crystals onto said chewing gum composition such that said crystals are present in an amount between about 5% and about 12% by weight, based on the total weights of said sanded chewing gum.

19. A method in accordance with claim 13 wherein said wetting syrup is a mixture of a maltitol syrup and Gum Arabic.

20. A method in accordance with claim 13 wherein said sugar alcohol crystals are xylitol.

21. A method of preparing a solid shaped chewing gum sanded with sugar alcohol which comprises (a) coating an unsanded solid shaped chewing gum with a wetting syrup comprising a tackifying agent and maltitol syrup said tackifying agent being present in sufficient quantities to adhere crystals of said sugar alcohol thereto and (b) sanding said product of (a) with crystals of sugar alcohol having a negative heat of solution comprised of xylitol, to form an uneven coating of said crystals of sugar alcohol on said chewing gum composition, wherein sugar alcohol crystals are embedded below the surface of the chewing gum and are of varying height in the coating of the chewing gum, said wetting syrup sanded with sugar alcohol form one layer on top of said chewing gum, the sugar alcohol crystals having an average particle size ranging from about 140 to about 200 microns and being present in sufficient amounts to impart an instantaneous cooling sensation when bit into by consumer.

22. The method according to claim 21 wherein maltitol is present in amounts ranging from about 40 to about 80% of the wetting syrup.

23. The method according to claim 21 wherein the tackifying agent is present in amounts ranging from about 1% to about 5% by weight of the wetting syrup.

24. The method according to claim 21 wherein the tackifying agent is gum arabic.

25. The method according to claim 21 wherein said sugar alcohol is xylitol in combination with erythritol, sorbitol, maltitol, mannitol or mixtures thereof.

26. The method according to claim 25 wherein said sugar alcohol is xylitol.

27. The method according to claim 21 wherein said sugar alcohol is present in amounts ranging from about 5% to 12% by weight of the chewing gum.

28. The method according to claim 21 wherein said wetting syrup is applied onto the surface of said solid-shaped chewing gum composition by panning.

29. The method according to claim 21 wherein said crystals of said sugar alcohol are applied to said wetting syrup on the surface of the solid-shaped chewing gum composition by panning or spraying.

* * * * *